F. Clausen.
Belt Buckle.

No. 90,501.        Patented May 25, 1869.

Witnesses:
Geo. H. Strong
J. L. Borne

Inventor:
Frances Clausen
By Dewey & Co.
Attys.

United States Patent Office.

FRANCIS CLAUSEN, OF SAN FRANCISCO, CALIFORNIA.

*Letters Patent No. 90,501, dated May 25, 1869.*

IMPROVED BELT-BUCKLE.

The Schedule referred to in these Letters Patent and making part of the same.

*To all whom it may concern:*

Be it known that I, FRANCIS CLAUSEN, of the city and county of San Francisco, State of California, have invented an Improvement in Belt-Buckles; and I do hereby declare the following description and accompanying drawings are sufficient to enable any person skilled in the art or science to which it most nearly appertains, to make and use my said invention or improvements without further invention or experiment.

My invention relates to an improvement in ladies' belt-buckles, and is an improvement on a buckle, for which Letters Patent were granted to me in August, 1868; and It consists in arranging on the bevelled projecting lip, over which the slotted bar folds, short teeth to aid in holding the ribbon or belt firmly in place.

To more fully illustrate and explain my invention, reference is had to the accompanying drawing, forming a part of this specification, of which—

Figure 1:
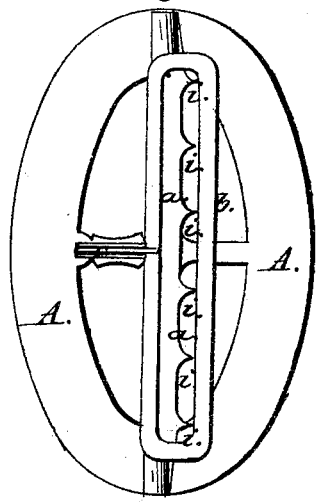
Figure 1 is a back view.
Figure 2:
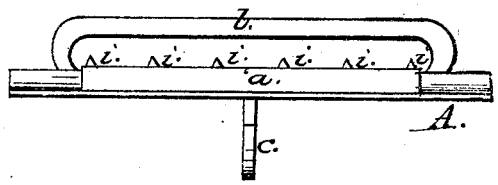
Figure 2 is a side view.

A is the plate of the buckle, having or the under side the bevelled projecting lip $a$.

A slotted bar, $b$, turns on gudgeons, and is arranged so that when one end of the belt is secured to it, and the belt passed around the waist, the opposite end is passed through the slotted bar, when, by pressing upon the projecting arm $c$, the slotted bar will be forced over the projecting lip, and bind the belt between the two.

This improvement contemplates arranging small teeth $i\ i$ along the edge of the bevelled lip $a$, so that when the slotted bar is forced over it, the teeth will enter the belt and prevent its slipping.

The teeth are made quite short, so that they will not pierce entirely through the belt, but merely enter it far enough to hold, thus answering the same purpose as the long teeth, without destroying the ribbon.

Having thus described my invention,

What I claim, and desire to secure by Letters Patent, is—

The projecting lip $a$, fixed relatively to the plate of the buckle, and provided with short or friction-teeth, in combination with the smooth, vibrating, slotted bar $b$, arranged to press the ribbon against said teeth, substantially as described.

FRANCIS CLAUSEN. [L. S.]

Witnesses:
    J. L. BOONE,
    GEO. H. STRONG.